United States Patent Office 3,565,953
Patented Feb. 23, 1971

3,565,953
INTERMEDIATES TO HEXAHYDRO-
2,5-BENZODIAZOCINES
Dong H. Kim, Wayne, Arthur A. Santilli, Havertown, Theodore S. Sulkowski, Montgomery, and Scott J. Childress, Philadelphia, Pa., assignors to American Home Products Corporation, New York, N.Y., a corporation of Delaware
No Drawing. Original application Sept. 26, 1966, Ser. No. 581,750, now Patent No. 3,496,164, dated Feb. 17, 1970. Divided and this application Sept. 9, 1969, Ser. No. 856,473
Int. Cl. C07c 143/74, 143/78
U.S. Cl. 260—556                              9 Claims

ABSTRACT OF THE DISCLOSURE

Compounds are described having the formula:

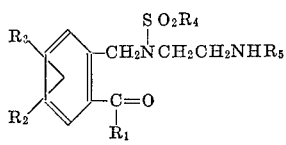

wherein $R_1$ is selected from the group consisting of phenyl, lower alkoxyphenyl, nitrophenyl, aminophenyl, halophenyl, halo(lower)alkylphenyl, thienyl and furyl; $R_2$ and $R_3$ are both selected from the group consisting of hydrogen, halogen, lower alkoxy, nitro, amino and halo(lower)alkyl; $R_4$ is selected from the group consisting of lower alkyl, phenyl, lower alkylphenyl, lower alkoxyphenyl and halophenyl; $R_5$ is selected from the group consisting of hydrogen and lower alkanoyl and the acid addition salts thereof.

This application is a division of application Ser. No. 581,750, filed Sept. 26, 1966, now U.S. Patent No. 3,496,164, patented Feb. 17, 1970, by the same inventors and entitled "Process for Preparing Hexahydro-2,5-Benzodiazocines."

This invention relates to a new and novel process for the preparation of hexahydro-2,5-benzodiazocines, as well as to novel intermediates. In particular, the present invention is concerned with new and novel N-[2-(N-[2-carbonylbenzyl]-sulfonamido)ethyl]amides; N-[2-aminoethyl]-N-[2-carbonylbenzyl]sulfonamides; 5-sulfonyl-tetrahydro-2,5-benzodiazocines and 5-sulfonylhexahydro-2,5-benzodiazocines having value as intermediates in the novel process for the synthesis of hexahydro-2,5-benzodiazocines which are known to possess pharmacological properties.

The new and novel compounds of this invention are represented by the following formulae:

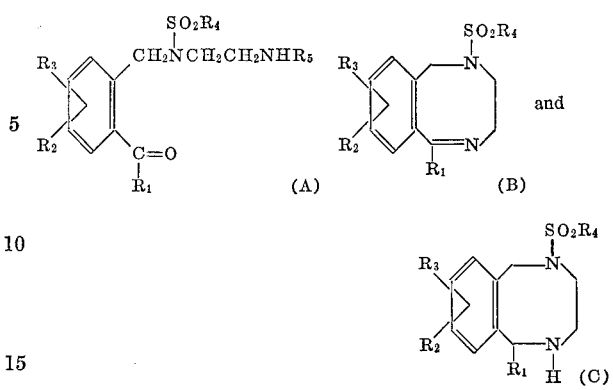

wherein $R_1$ is selected from the group consisting of phenyl, lower alkoxyphenyl, nitrophenyl, aminophenyl, halophenyl, halo(lower)alkylphenyl, thienyl, and furyl; $R_2$ and $R_3$ are both selected from the group consisting of hydrogen, halogen, lower alkoxy, nitro, amino, and halo(lower)alkyl; $R_4$ is selected from the group consisting of lower alkyl, phenyl, lower alkylphenyl, lower alkoxyphenyl and halophenyl; $R_5$ is selected from the group consisting of hydrogen and lower alkanoyl; and the acid addition salts thereof, with the proviso that for compounds of structural Formula C the definition of $R_1$ does not include nitrophenyl and the definitions of $R_2$ and $R_3$ do not include nitro.

The new compounds represented by structural Formula A, when $R_5$ is lower alkanoyl, properly are called: "N-[2-(N-[2-carbonylbenzyl]-sulfonamido)ethyl]amides." Typical examples thereof are N-[2-(N-[2-(4-chlorobenzoyl)benzyl]-4-tolylsulfonamido)ethyl]acetamide; N-[2-(N-[2-(4-chlorobenzoyl)benzyl]-phenylsulfonamido)ethyl]acetamide; and N-[2-N-[2-(4-bromobenzoyl)benzyl]-4-bromophenylsulfonamido)ethyl]acetamide. When $R_5$ is hydrogen, the compounds of Formula A are named: "N-[2-aminoethyl]-N-[2-carbonylbenzyl]sulfonamides," examples thereof are N-[2-aminoethyl]-N-[2-(4-chlorobenzoyl)benzyl]benzenesulfonamide; N-[2-aminoethyl]-N-[2-(4-chlorobenzoyl)benzyl]-4-toluenesulfonamide; and N-[2-aminoethyl]-N-[2-benzoylbenzyl]-propanesulfonamide.

The new compounds designated by structural Formula B are named "5-sulfonyl-tetrahydro-2,5-benzodiazocines," such as, 1-(4-chlorophenyl)-3,4,5,6-tetrahydro-5-phenylsulfonyl-2,5-benzodiazocine; 1-(4-chlorophenyl)-3,4,5,6-tetrahydro-5-(4-tolylsulfonyl)-2,5-benzodiazocine; and 3,4,5,6-tetrahydro-1-phenyl-5-propylsulfonyl-2,5-benzodiazocine. Alternatively, when the new compounds are depicted by structural Formula C, they are designated as "5-sulfonyl-hexahydro-2,5-benzodiazocines," such as, 1-(4-chlorophenyl)-1,2,3,4,5,6-hexahydro-5-phenylsulfonyl-2,5-benzodiazocines; 1-(4-chlorophenyl)-1,2,3,4,5,6-hexahydro-5-(4-tolylsulfonyl)-2,5-benzodiazocine; and 1,2,3,4,5,6-hexahydro-1-phenyl-5-propylsulfonyl-2,5-benzodiazocine.

In accord with the process of the present invention, the novel compounds thereof and the prior art hexahydro- 2,5-benzodiazocines are synthesized by the following schematic sequence of reactions:

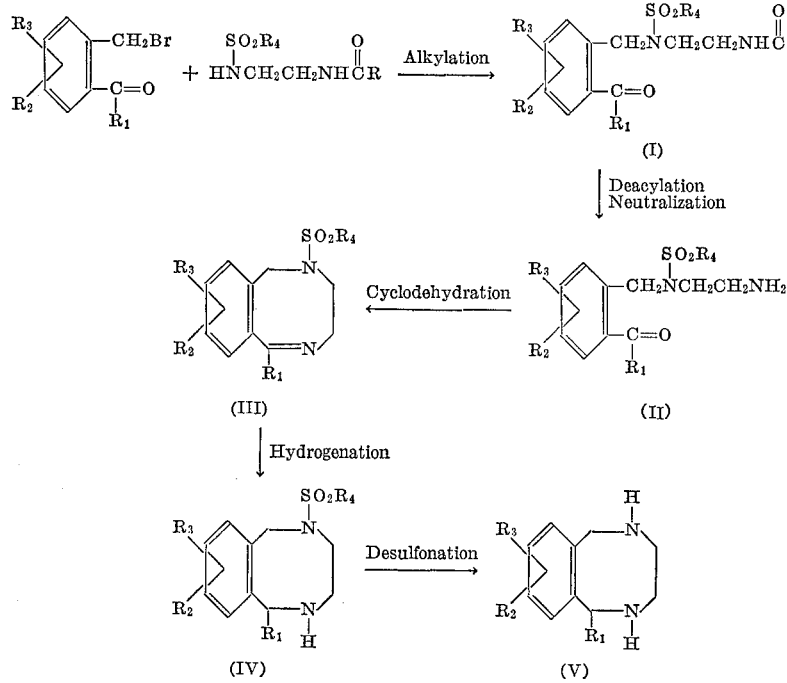

wherein R is alkyl and $R_1$, $R_2$, $R_3$ and $R_4$ are defined as above, with the proviso that for the above designated 5-sulfonyl-hexahydro-2,5-benzodiazocines (IV) and hexahydro-2,5-benzodiazocines (V) the definition of $R_1$ does not include nitrophenyl and the definitions of $R_2$ and $R_3$ do not include nitro.

The alkylation reaction between approximately equimolar amounts of a 2-bromomethyl benzoyl compound and an appropriate N-acyl-N'-sulfonylethylenediamine is effected by heating a mixture of these reactants in an alkanol in the presence of an alkaline alkylating agent at a temperature from about 60° C. to about 90° C. for a period of from about one-half hour to about five hours. Preferably, this reaction is conducted at about the reflux temperature of the reaction mixture for about one hour. After the reaction is complete, the reaction mixture is cooled, the resulting N-[2-(N-[2-carbonylbenzyl]-sulfonamido)ethyl]amide (I) is obtained by conventional methods, such as filtration, concentration, alkalinization, extraction and crystallization.

Deacylation of an above prepared N-[2-(N-[2-carbonylbenzyl]-sulfonamido)ethyl]amide (I) is accomplished by contact with a mineral acid at about reflux temperatures for a period of from about three to about eight hours. Preferably, this reaction is conducted in about 10 to about 20 percent (v./v.) sulfuric acid. When the deacylation reaction is complete, the product is separated by filtration, and neutralized with a base to yield a N-[2-aminoethyl] - N - [2-carbonylbenzyl]sulfonamide (II). Preferably, this neutralization is conducted with sodium or potassium hydroxide at about steam bath temperatures for approximately fifteen minutes. Alternatively, the deacylation reaction may be carried out by use of basic hydrolytic agents, such as sodium hydroxide, preferably by refluxing the N-[2-(N-[2-carbonylbenzyl]-sulfonamido)ethyl]amide (I) in ethanolic sodium hydroxide (5 percent w./v.) for several hours.

The above prepared amine (II) is cyclodehydrated by admixture with pyridine hydrochloride, in pyridine at about reflux temperatures for a period of about twenty to about forty hours. When the cyclodehydration reaction is complete, the resulting 5-sulfonyl-tetrahydro-2,5-benzodiazocine (III) is separated and purified by concentration, extraction, reconcentration and crystallization.

Suitable solvents for these purposes will readily suggest themselves to those skilled in the art of chemistry.

Hydrogenation of an above prepared 5-sulfonyltetrahydro-2,5-benzodiazocine (III) may be accomplished by contact with hydrogen, in the presence of a catalyst, such as platinum oxide, palladium and the like. Alternatively, this hydrogenation may be conducted by contact with chemical reducing agents, for example, lithium aluminum hydride and dimethylamineborane. Preferably, this reaction is conducted, in an alkanol by contact with hydrogen, in the presence of a catalytic amount of platinum oxide. When the reduction is complete, the resulting 5-sulfonyl-hexahydro-2,5-benzodiazocine (IV) is separated by standard recovery procedures, for example, filtration, evaporation and crystallization. It should be noted that this hydrogenation reaction will also convert any nitro substituents present on a 5-sulfonyl-tetrahydro-2,5-benzodiazocine (III) to the corresponding amino substituent on the resulting 5-sulfonyl - hexahydro-2,5-benzodiazocine (IV).

The above prepared 5-sulfonyl-hexahydro-2,5-benzodiazocine (IV) may be desulfonated by admixture with concentrated sulfuric acid (about 80 to about 100 percent sulfuric acid). Preferably, this reaction is conducted by admixture with about 90 percent sulfuric acid which is warmed until a clear solution forms and is then allowed to stand at approximately rom temperature for a period of about one-half hour to about five hours. When the desulfonation reaction is complete, the hexahydro-2,5-benzodiazocine (V) is recovered by conventional means, such as neutralization and recrystallization from an appropriate organic solvent, such as ether, chloroform and toluene.

Since many of the compounds prepared by the present invention are basic, advantage may be taken of the water solubility of salts of these compounds formed with acids in the isolation and/or purification of the above compounds and in the preparation of aqueous solutions of these new compounds for oral or parenteral administration. Of course, only salts formed with pharmaceutically acceptable acids should be employed in therapeutic applications. Particularly effective salts are those formed with pharmaceutically acceptable acids having a pK value of 3 or lower. Such acids are well known in the art, for example, hydrochloric, hydrobromic, sulfuric, nitric, phosphoric, benzenesulfonic, toluenesulfonic, methanesulfonic, ethanesulfonic acids and the like. These salts may be prepared by procedures commonly employed in the art, for example, reacting the compounds with an equivalent of the selected acid in aqueous solution and concentration of the solution. Other known procedures may also be employed.

The time and temperature ranges employed in the aforesaid reactions are not critical but simply represent the most convenient ranges consistent with carrying out the reaction in a minimum of time without undue difficulty. Thus, reaction temperatures appreciably below these can be used, but their use considerably extends the reaction time. Similarly, reaction temperatures higher than those mentioned can be employed with a concomitant decrease reaction time. By the term alkaline alkylation agent, it is meant to include agents suitable for promoting the aforesaid alkylation reaction, such as alkali metals, their alkoxides and their alkoxyalkoxides. Preferred among those catalysts are sodium hydroxide, potassium hydroxide, sodium methoxide, sodium hydride and sodium ethoxyethoxide.

Many of the reactants employed in the above described process are known compounds which are available from commercial sources, while others can be prepared in accord with well known procedures. The 2-bromomethyl benzoyl compounds which are used as reactants herein are described and claimed in U.S. patent application, Ser. No. 581,751, filed on Sept. 26, 1966, by Kim et al. and entitled "Bromomethylbenzophenones and Related Compounds."

In accord with the present invention, the novel N-[2-aminoethyl]-N-[2-carbonylbenzyl]sulfonamides (II) and the 5-sulfonyl-hexahydro - 2,5 - benzodiazocines (IV) herein described have been found to possess interesting pharmaceutical properties which render them useful as synthetic medicinals. More particularly, in standard pharmacological tests, these compounds have been found to have utility as anti-convulsants. Further, the aforementioned N-[2-(N-[2-carbonylbenzyl] - sulfonamido)ethyl]amine (I), the N-[2-aminoethyl]-N-[2-carbonylbenzyl]sulfonamides (II), the 5-sulfonyl-tetrahydro-2,5-benzodiazocines (III), and the 5-sulfonyl-hexahydro-2,5-benzodiazocines (IV) have also demonstrated utility as intermediates in the preparation of the pharmacologically active hexahydro-2,5-benzodiazocines (V).

When the N - [2 - aminoethyl] - N - [2 - carbonylbenzyl]sulfonamides (II) and the 5 - sulfonyl - hexahydro - 2,5 - benzodiazocines (IV) of this invention are employed as anticonvulsants they may be administered alone or in combination with pharmaceutically acceptable carriers, the proportion of which is determined by the solubility and chemical nature of the compounds, chosen route of administration and standard pharmaceutical practice. For example, they may be administered orally in the form of tablets or capsules containing such excipients as starch, milk sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agents will be required to produce the same effect as a smaller quantity given parenterally. In general, the compounds of this invention are most desirably administered at a concentration level that will generally afford effective results without causing any harmful or deleterious side effects and preferably at a level that is in the range of from about 5 mg. to about 500 mg. per day, although as aforementioned variations will occur. However, a dosage level that is in the range of from about 10 mg. to about 150 mg. per day is most desirably employed in order to achieve effective results.

The following examples are given by way of illustration and are not to be construed as limitations of this invention, many variations of which are possible without departing from the scope and spirit thereof.

EXAMPLE I

To a solution of 17 g. of N - acetyl - N' - phenylsulfonylethylenediamine and 4.7 g. of potassium hydroxide (85%) in 70 ml. of absolute alcohol there is added 15 g. of 2' - bromomethyl - 4 - chlorobenzophenone in small portions with mechanical stirring. The resulting mixture is heated to reflux for 30 minutes and then allowed to cool to room temperature. The precipitated salt is removed by filtration, the filtrate concentrated under reduced pressure and then treated with 100 ml. of 2 N sodium hydroxide solution. The product is extracted with ether. Addition of 150 ml. of water to the ether solution causes the slow separation of a precipitate which is collected by filtration and washed with ether several times to yield 16 g. of white crystals of N - [2 - (N - [2 - (4 - chlorobenzoyl)benzyl]phenylsulfonamido)ethyl]acetamide, M.P. 103–105° C.

*Analysis.*—Calc'd for $C_{24}H_{23}ClN_2O_4S$ (percent): C, 61.20; H, 4.92; N, 5.95; S, 6.81; Cl, 7.54. Found (percent): C, 60.84; H, 4.74; N, 6.15; S, 6.7; Cl, 7.5.

EXAMPLE II

To a solution of 7.7 g. of N-acetyl-N'-tosylethylenediamine, 2.02 g. of potassium hydroxide (85%) and 30 ml. of absolute ethanol, there is added 7.7 g. of 2'-bromomethyl-4-chlorobenzophenone in small portions with stirring. The reaction mixture is heated to reflux for thirty minutes and then cooled to room temperature. Thereafter, the precipitated salt is removed by filtration, the filtrate concentrated under vacuum, treated with 50 ml. of 2 N sodium hydroxide solution, and extracted with ether. Concentration of the combined ether extracts causes separation of an oil which is N - [2 - (N-[2 - (4 - chlorobenzoyl)benzyl] - 4 - tolylsulfonamido)ethyl]acetamide which is separated by decantation.

EXAMPLE III

The procedure of Examples I and II is repeated reacting an appropriate 2-bromomethyl benzoyl compound with an N-acyl-N'-sulfonyl ethylenediamine to produce the hereinafter listed products:

| Starting material | Product |
| --- | --- |
| 5-bromo-2-bromomethyl-benzophenone and N-butyryl-N'-methylsulfonylethylenediamine. | N-[2-(N-[2-benzoyl-4-bromobenzyl]-methylsulfonamido)ethyl]butyramide. |
| 2-bromomethyl-3-fluorobenzophenone and N-acetyl-N'-(4-methoxyphenylsulfonyl)ethylenediamine. | N-[2-(N-[2-benzoyl-6-fluorobenzyl]-4-methoxyphenylsulfonamido)ethyl]acetamide. |

EXAMPLE IV

To a solution of 12.0 g. of N-acetyl-N'-propylsulfonylethylenediamine, 2.3 g. of sodium hydroxide and 60 ml. of absolute methanol, there is added 15.0 g. of 2-bromomethylbenzophenone in small portions with stirring. The reaction mixture is then heated to reflux for two hours and cooled to 30° C. Subsequently, the precipitated salt is removed by filtration, the filtrate concentrated under vacuum, treated with 50 ml. of 4 N potassium hydroxide solution, and extracted with chloroform. Concentration of the combined chloroform extracts causes the separation of N - [2 - (N - [2 - benzoylbenzyl] - propylsulfonamido)ethyl]acetamide.

In a similar manner, reacting 2-bromomethyl-3',4'-dichlorobenzophenone with N - valeryl - N' - (4 - chlorophenylsulfonyl)ethylenediamine there is obtained N-[2-(N - [2 - (3,4 - dichlorobenzoyl)benzyl] - 4 - chlorophenylsulfonamido)ethyl]valeramide.

EXAMPLE V

To a solution containing 3.6 g. of N-acetyl-N'-(4-bromophenylsulfonyl)ethylenediamine, 0.6 g. of sodium methoxide and 15 ml. of butanol, there is added 3.6 g. of 2'-bromomethyl-4-bromobenzophenone in small portions with stirring. The reaction mixture is heated to reflux for five hours and then cooled to room temperature. The precipitated salt is removed by filtration, the filtrate concentrated under vacuum, treated with 50 ml. of saturated sodium bicarbonate solution, and extracted with benzene. Concentration of the combined benzene extracts causes the separation of N-[2-(N-[2-(4-bromobenzoyl)benzyl] - 4 - bromophenylsulfonamido)ethyl]acetamide.

Similarly, N-[2(N-[2-(2,4 - dibromobenzoyl)benzyl]-4 - bromophenylsulfonamido)ethyl]propionamide is prepared.

EXAMPLE VI

To a solution of 27 g. of N-caproyl-N'-(4-ethoxyphenylsulfonyl)ethylenediamine and 7.5 g. of sodium ethoxide, 250 ml. of absolute ethanol, there is added 34 g. of 2'-bromomethyl - 4 - trifluoromethylbenzophenone in small portions with stirring. The reaction mixture is then heated to 70° C. for four hours and cooled to 30° C. Subsequently, the precipitated salt is removed by filtration, the filtrate is concentrated under vacuum, and the residue is treated with 100 ml. of 2 N sodium hydroxide solution, and extracted with toluene. Concentration of the combined toluene extracts causes the separation of N-[2-(N-[2-(4 - trifluoromethylbenzoyl)benzyl] - 4 - ethoxyphenylsulfonamido)ethyl]caproamide.

In a similar manner, N-[2-(N-[2-(4-dichloromethylbenzoyl)benzyl] - ethylsulfonamido)ethyl]acetamide; N-[2-(N-[2 - furoylbenzyl]-phenylsulfonamido)ethyl]acetamide and N-[2-(N-[2 - thienylbenzoyl]-phenylsulfonamido)ethyl]acetamide are produced.

EXAMPLE VII

Repeating the procedure of Example VI but reacting 2'-bromomethyl - 4 - methoxybenzophenone and N-acetyl-N'-phenylsulfonylethylenediamine, there is obtained N-[2-(N-[2 - (4 - methoxybenzoyl)benzyl]-phenylsulfonamido)ethyl]acetamide.

EXAMPLE VIII

When the procedure of the aforementioned examples is employed, reacting an appropriate 2 - bromomethyl benzoyl compound, with an N-acyl-N'-sulfonyl ethylenediamine, the following products are obtained:

| Starting materials | Products |
| --- | --- |
| 2-bromomethyl-6-chlorobenzophenone and N-acetyl-N'-(4-fluorophenylsulfonyl)ethylenediamine. | N-[2-(N-[2-benzoyl-3-chlorobenzyl]-4-fluorophenylsulfonamido)ethyl]acetamide. |
| 2-bromomethyl-5-nitrobenzophenone and N-acetyl-N'-(4-propylphenylsulfonyl)ethylenediamine. | N-[2-(N-[2-benzoyl-4-nitrobenzyl]-4-propylphenylsulfonamido)ethyl]acetamide. |
| 2'-bromomethyl-4,5-dichlorobenzophenone and N-butyryl-N'-(4-methoxyphenylsulfonyl)ethylenediamine. | N-[2-(N-[2-benzoyl-4,5-dichlorobenzyl]-4-methoxyphenylsulfonamido)ethyl]butyramide. |
| 2-bromomethyl-4-methoxybenzophenone and N-acetyl-N'-phenylsulfonylethylenediamine. | N-[2-(N-[2-benzoyl-4-methoxybenzyl]phenylsulfonamido)ethyl]acetamide. |

EXAMPLE IX

To a solution of 5.3 g. of N-acetyl-N'-phenylsulfonylethylenediamine, 1.9 g. of potassium ethoxide and 30 ml. of absolute ethanol, there is added 6.4 g. of 2'-bromomethyl-4-nitrobenzophenone in small portions with stirring. The reaction mixture is then heated to 75° C. for one hour and cooled to about 20° C. The resulting precipitated salt is removed by filtration, the filtrate concentrated under vacuum, treated with 100 ml. of saturated potassium bicarbonate solution, and extracted with carbon tetrachloride. Concentration of the combined carbon tetrachloride extracts causes the separation of N-[2-(N - [2 - (4 - nitrobenzoyl)benzyl]phenylsulfonamido)ethyl]acetamide.

Similarly, the following compounds are prepared:

N-[2-(N-[2 - (4 - ethoxybenzoyl)benzyl]phenylsulfonamido)ethyl]propionamide; and N-[2-(N-[2 - (4 - dichloromethylbenzoyl)benzyl]-4-tolylsulfonamide)ethyl]butyramide.

EXAMPLE X

To a solution of 28.2 g. of N-acetyl-N'-tosylethylenediamine, 7.3 g. of potassium hydroxide (85%) and 90 ml. of absolute ethanol, there is added 29.3 g. of 2'-bromomethyl-4-fluorobenzophenone in small portions with stirring. The reaction mixture is then heated to reflux for thirty minutes and cooled to room temperature. Subsequently, the resulting precipitated salt is removed by filtration, the filtrate concentrated under vacuum, treated with 150 ml. of 2 N sodium hydroxide solution, extracted with ether. Addition of 225 ml. of water to the combined ether extracts causes the slow separation of N-[2-(N-[2-(4 - fluorobenzoyl)benzyl] - 4 - tolylsulfonamido)ethyl] acetamide.

In a similar manner, N-[2-(N-[2-(4-bromobenzoyl)-5-nitrobenzyl] - phenylsulfonamido)ethyl]acetamide; N-[2-(N-[2 - (4-propoxybenzoyl)benzyl]-phenylsulfonamido)ethyl]acetamide and N-[2-(N-[2-(3-ethoxybenzoyl)-4-trifluoromethylbenzyl] - phenylsulfonamido)ethyl]butyramide are produced.

EXAMPLE XI

To a solution of 2.0 g. of N-acetyl-N'-methylsulfonylethylenediamine, 0.5 g. of sodium hydroxide and 15 ml. of methanol, there is added 3.1 g. of 2-bromomethyl-6-chlorobenzophenone in small portions with stirring. The reaction mixture is then heated to reflux for forty minutes and cooled to 25° C. The resulting precipitate is removed by filtration, the filtrate concentrated under vacuum, treated with 50 ml. of 2 N potassium hydroxide solution, and extracted with chloroform. Concentration of the combined chloroform extracts causes the separation of N-[2-(N-[2-benzoyl - 3 - chlorobenzyl]-methylsulfonamido)ethyl]acetamide.

Similarly, the following compounds are synthesized:

N-[2-(N-[2 - (4 - fluorobenzoyl)benzyl]-phenylsulfonamido)ethyl]valeramide; and

N-[2-(N-[2-benzoyl - 4 - fluorobenzyl]-phenylsulfonamido)ethyl]acetamide.

EXAMPLE XII

When the procedure of Example XI is repeated employing the appropriate reactants, the following products are obtained:

N-[2-(N-[2-benzoyl - 5 - butoxybenzyl]phenylsulfonamido)ethyl]acetamide;

N-[2-(N-[2-benzoyl - 4,5 - dibromobenzyl]propylsulfonamido)ethyl]butyramide;

N-[2-(N-[2-benzoyl - 5 - trifluoromethylbenzyl]-butylsulfonamido)ethyl]acetamide; and N-[2-(N - [2-benzoyl-4-dichloromethylbenzyl]-propylsulfonamido)ethyl]acetamide.

EXAMPLE XIII

A mixture of 2.5 g. of N-[2-(N-[2-(4-chlorobenzoyl)benzyl]phenylsulfonamido)ethyl]acetamide, as prepared in Example I, and 25 ml. of 20% (v./v.) sulfuric acid are heated under reflux for four hours and then allowed to stand overnight at room temperature. The solid cake which separates is washed with water several times, then washed with 50 ml. of ether and filtered under suction. Washing with ether is continued until the filtrate becomes colorless. The product (1.8 g.) obtained in this manner, is recrystallized three times from water to afford N-[2-aminoethyl]-N-[2-(4 - chlorobenzoyl)benzyl]benzenesulfonamide, sulfate, M.P. 126–128° C.

*Analysis.*—Calc'd for $C_{22}H_{21}ClN_2O_3S \cdot \frac{1}{2}H_2SO_4$ (percent): C, 55.29; H, 4.64; N, 5.86; S, 10.05; Cl, 7.42. Found (percent): C, 55.33; H, 4.66; N, 5.72; S, 10.0; Cl, 7.4.

The above prepared N-[2-aminoethyl]-N-[2-(4-chlorobenzoyl)benzyl]-benzenesulfonamide, sulfate is then converted to the free amine by treatment with 30% sodium hydroxide solution on a steam bath for fifteen minutes. Thereafter, 1.5 g. of the crude dried N-[2-aminoethyl] - N - [2-(4-chlorobenzoyl)benzyl]-benzenesulfonamide and 0.54 g. of dry pyridine hydrochloride in 600 ml. of pyridine are refluxed for twenty hours. After removing the pyridine by evaporating under reduced pressure, the product is extracted with ether. The ether extract is then washed with water three times and dried over anhydrous magnesium sulfate. Evaporation of ether under reduced pressure affords an oil which upon treatment with 95% ethanol yields 0.75 g. of product. Recrystallization from dilute ethanol yields 1-(4-chlorophenyl)-3,4,5,6-tetrahydro-5-phenylsulfonyl - 2,5 - benzoidiazocine, M.P. 115–117° C.

*Analysis.*—Calc'd for $C_{22}H_{19}ClO_2N_2S$ (percent): C, 64.30; H, 4.66; N, 6.82; S, 7.80; Cl, 8.63. Found (percent): C, 64.16; H, 4.40; N, 6.57; S, 7.8; Cl, 8.4.

EXAMPLE XIV

The N-[2-(N-[2-(4 - chlorobenzoyl)benzyl]-4-tolylsulfonamido)ethyl]acetamide (3.0 g.), as prepared in Example II, is hydrolyzed by refluxing in 100 ml. of 20% (v./v.) sulfuric acid for three hours. The resulting resinous mass is washed with water several times, then with ether until a solid is obtained. Recrystallization of the product from water affords needles of N-[2-aminoethyl]-N-[2-(4-chlorobenzoyl)benzyl] - 4 - toluenesulfonamide, sulfate, M.P. 165–167° C.

*Analysis.*—Calc'd for $C_{23}H_{23}ClN_2O_3S \cdot \frac{1}{2}H_2SO_4$ (percent): C, 56.14; H, 4.92; N, 5.70; S, 9.78; Cl, 7.21. Found (percent): C, 56.09; H, 4.61; N, 5.70; S, 9.9; Cl, 7.5.

The above prepared N-[2-aminoethyl]-N-[2-(4-chlorobenzoyl)benzyl]-4-toluenesulfonamide, sulfate (1.4 g.) is treated with 30 ml. of 30% sodium hydroxide solution with warming on a steam bath for fifteen minutes. The cake which forms on cooling is washed with water thoroughly and dried, M.P. 68–75° C. A pyridine solution obtained by dissolving 1.0 g. of the free amine and 0.36 g. of dry pyridine hydrochloride in 45 ml. of pyridine is refluxed for eighteen hours. After evaporating the pyridine under reduced pressure, the product is extracted with ether which extract is then washed with water and dried over anhydrous magnesium sulfate. Evaporation of the ether solution affords 0.85 g. of product, which when recrystallized from absolute ethanol affords 1-(4-chlorophenyl)-3,4,5,6-tetrahydro-5 - (4-tolylsulfonyl)-2,5-benzodiazocine, M.P. 173–174.5° C.

*Analysis.*—Calc'd for $C_{23}H_{21}ClO_2N_2S$ (percent): C, 65.01; H, 4.98; N, 6.59; S, 7.55; Cl, 8.34. Found (percent): C, 64.85; H, 4.79; N, 6.76; S, 7.5; Cl, 8.4.

EXAMPLE XV

The procedure of Examples XIII and XIV is repeated to deacylate and neutralize the amide products of Example III to produce the hereinafter listed sulfonamides which are then converted to their corresponding 5-sulfonyltetrahydro-2,5-benzodiazocines:

| Sulfonamides | Tetrahydro-2,5-benzodiazocines |
|---|---|
| N-[2-aminoethyl]-N-[2-benzoyl-4-bromobenzyl]-methanesulfonamide. | 9-bromo-3,4,5,6-tetrahydro-5-methylsulfonyl-1-phenyl-2,5-benzodiazocine. |
| N-[2-aminoethyl]-N-[2-benzoyl-6-fluorobenzyl]-4-methoxyphenylsulfonamide. | 3,4,5,6-tetrahydro-7-fluoro-5-(4-methoxyphenylsulfonyl)-1-phenyl-2,5-benzodiazocine. |

EXAMPLE XVI

The N-[2-(N-[2-benzoylbenzyl]-propanesulfonamido)ethyl]acetamide (5.0 g.), as prepared in Example IV, is hydrolyzed by refluxing in 50 ml. of 20% (v./v.) sulfuric acid for three hours. The resulting mass is then washed with water and chloroform until a solid is obtained. Recrystallization of the product from water affords N-[2-aminoethyl]-N-[2-benzoylbenzyl]-propanesulfonamide, sulfate, which is treated with a 20% sodium hydroxide solution at 25° C. for twenty minutes. The resulting solid is washed with water and dried. The free amine (2.0 g.) is admixed with 0.75 g. of dry pyridine hydrochloride and 90 ml. of pyridine. The mixture is refluxed for thirty hours. Thereafter, the pyridine is removed under reduced pressure, the product extracted with chloroform, the extracts combined, washed with water and dried over anhydrous magnesium sulfate. Evaporation of the chloroform solution and recrystallization of the residue from ethanol yields 3,4,5,6-tetrahydro-1-phenyl-5-propylsulfonyl-2,5-benzodiazocine.

Similarly, deacylating N-[2-(N-[2-(3,4-dichlorobenzoyl)benzyl]-4 - chlorophenylsulfonamido)ethyl]valeramide yields N-[2-aminoethyl]-N-[2-(3,4-dichlorobenzoyl)benzyl]-4-chlorobenzenesulfonamide, sulfate, which is then neutralized and cyclodehydrated to afford 1-(3,4-dichlorophenyl)-5-(4 - chlorophenylsulfonyl)-3,4,5,6-tetrahydro-2,5-benzodiazocine.

EXAMPLE XVII

The N-[2-(N-[2-(4 - bromobenzoyl)benzyl]-4-bromophenylsulfonamide)ethyl]acetamide (10.0 g.), as prepared in Example V, is hydrolyzed by refluxing in 300 ml. of 5% (w./v.) ethanolic sodium hydroxide five hours. The mixture is concentrated in vacuo and the resulting mass is washed with water and benzene until a solid is obtained. Recrystallization of the product from water affords N-[2-aminoethyl]-N-[2-(4-bromobenzoyl)benzyl]-4-bromobenzenesulfonamide, hydrochloride.

The above prepared sulfonamide hydrochloride (3.0 g.) is then treated with 0.75 ml. of sodium hydroxide (30%) solution at room temperature for thirty minutes. The resulting solid is washed with water, dried and 2.0 g. of the free amine is admixed with 0.72 g. of dry pyridine hydrochloride and 90 ml. of pyridine. The mixture is refluxed for forty hours. Thereafter, the pyridine is removed under reduced pressure, the product is extracted with benzene, the benzene extracts combined, washed with water and dried over anhydrous magnesium sulfate. Evaporation of the benzene solution and recrystallization from methanol yields 1-(4-bromophenyl)-5-(4-bromophenylsulfonyl)-3,4,5,6-tetrahydro-2,5-benzodiazocine.

Similarly, N-[2-(N-[2-(N-[2,4-dibromobenzoyl)benzyl]-4 - bromophenylsulfonamido)ethyl]propionamide is deacylated and neutralized to form N-[2-aminoethyl]-N-[2-(2,4 - dibromobenzoyl)benzyl]-4-bromobenzene sulfonamide. Subsequently, this sulfonamide is cyclodehydrated to the corresponding 1-(2,4-dibromophenyl)-5-(4-bromophenylsulfonyl)-3,4,5,6-tetrahydro - 2,5 - benzodiazocine.

Also N-[2 - (N-[2-furoylbenzyl]-phenylsulfonamido)ethyl]acetamide is converted to N-[2-aminoethyl]-N-[2-furoylbenzyl]benzenesulfonamide which is thereupon cyclized to 1-(2-furyl)-3,4,5,6-tetrahydro-5-phenylsulfonyl-2,5-benzodiazocine.

EXAMPLE XVIII

N-[2-(N-[2 - (4 - trifluoromethylbenzoyl)benzyl]-4-ethoxyphenylsulfonamido)ethyl]caproamide (25.0 g.), as prepared in Example VI is refluxed in 500 ml. of 10% (v./v.) sulfuric acid for seven hours. The resulting mass is washed with water and toluene and then recrystallized from water to yield N-[2-aminoethyl]-N-[2-(4-trifluoromethylbenzoyl-2-naphthoyl)benzyl] - 4 - ethoxybenzenesulfonamide, sulfate, which is then treated with a 5% potassium hydroxide solution for forty minutes. The resulting solid is washed with water, dried and 5.0 g. of the free amine is admixed with 1.8 g. of dry pyridine hydrochloride and 225 ml. of pyridine. The mixture is refluxed for twenty-five hours. The pyridine is removed under reduced pressure, extracted with ether, the ether extracts are combined, washed with water and dried over anhydrous magnesium sulfate. Evaporation of the ether and recrystallization from ethanol yields 5-(4-ethoxyphenylsulfonyl)-3,4,5,6-tetrahydro - 1 - (4-trifluoromethylphenyl)-2,5-benzodiazocine.

In a similar manner, starting with the appropriate amide the following sulfonamides and their corresponding tetrahydro-2,5-benzodiazocines are obtained:

| Sulfonamides | Tetrahydro-2,5-benzodiazocines |
| --- | --- |
| N-[2-aminoethyl]-N-[2-(4-dichloromethylbenzoyl)benzyl]-ethanesulfonamide. | 1-(4-dichloromethylphenyl)-5-ethylsulfonyl-3,4,5,6-tetrahydro-2,5-benzodiazocine. |
| N-[2-aminoethyl]-N-[2-thenoyl-benzyl]-benzenesulfonamide. | 3,4,5,6-tetrahydro-5-phenyl-sulfonyl-1-thienyl-2,5-benzodiazocine. |

EXAMPLE XIX

Repeating the procedure of Example XVIII but starting with N-[2-(N-[2-(4-methoxybenzoyl)benzyl]-phenylsulfonamido)ethyl]acetamide, there is obtained N-[2-aminoethyl]-N-[2-(4 - methoxybenzoyl)benzyl]-benzenesulfonamide, sulfate, and the corresponding 5-phenylsulfonyl - 3,4,5,6-tetrahydro-1-(4-methoxyphenyl) - 2,5-benzodiazocine.

EXAMPLE XX

When the procedure of Examples XIII to XIX is employed, reacting the amides from Example VIII as starting materials, the following sulfonamides and their corresponding tetrahydro-2,5-benzodiazocines are obtained:

| Sulfonamides | Tetrahydro-2,5-benzodiazocine |
| --- | --- |
| N-[2-aminoethyl]-N-[2-benzoyl-3-chlorobenzyl]-4-fluorobenzenesulfonamide. | 10-chloro-3,4,5,6-tetrahydro-5-(4-fluorophenylsulfonyl)-1-phenyl-2,5-benzodiazocine. |
| N-[2-aminoethyl]-N-[2-benzoyl-4-nitrobenzyl]-4-propylbenzene sulfonamide. | 3,4,5,6-tetrahydro-9-nitro-1-phenyl-5-(4-propylphenyl-sulfonyl)-2,5-benzodiazocine. |
| N-[2-aminoethyl]-N-[2-benzoyl-4,5-dichlorobenzyl]-4-methoxy-benzenesulfonamide. | 8,9-dichloro-3,4,5,6-tetrahydro-1-phenyl-5-(4-methoxy-phenylsulfonyl)-2,5-benzodiazocine. |
| N-[2-aminoethyl]-N-[2-benzoyl-4-methoxybenzyl]-benzenesulfonamide. | 3,4,5,6-tetrahydro-8-methoxy-1-phenyl-5-phenylsulfonyl-2,5-benzodiazocine. |

EXAMPLE XXI

N-[2-(N-[2 - (4 - nitrobenzoyl)benzyl]-phenylsulfonamido)ethyl]acetamide (2.5 g.), as prepared in Example IX, is hydrolyzed by refluxing in 25 ml. of 20% (v./v.) sulfuric acid for four hours. The resulting mass is washed with water and ether until a solid is obtained. Recrystallization of the product from water affords N-[2-aminoethyl]-N-[2-(4-nitrobenzoyl)benzyl]benzenesulfonamide, sulfate.

The above prepared sulfonamide sulfate (1.0 g.) is then treated with 0.5 ml. of 30% sodium hydroxide solution at 25° C. for thirty minutes. The resulting solid is washed with water, dried and 0.5 g. of the free amine is admixed with 0.18 g. of dry pyridine hydrochloride and 25 ml. of pyridine. The mixture is refluxed for twenty-five hours. Thereafter, the pyridine is removed under reduced pressure, the product is extracted with ether, the ether extracts combined, washed with water and dried over anhydrous magnesium sulfate. Evaporation of the ether solution and recrystallization from propanol yields 3,4,5,6-tetrahydro - 1 - (4-nitrophenyl)-5-phenylsulfonyl-2,5-benzodiazocine.

Similarly, employing the above procedure with the appropriate amides as prepared in Example IX, the following sulfonamides and tetrahydro-2,5-benzodiazocines are prepared:

| Sulfonamides | Tetrahydro-2,5-benzodiazocines |
| --- | --- |
| N-[2-aminoethyl]-N-[2-ethoxy-benzoyl)benzyl]phenylsulfonamide. | 1-(4-ethoxyphenyl)-3,4,5,6-tetrahydro-5-phenylsulfonyl-2,5-benzodiazocine. |
| N-[2-aminoethyl]-N-[2-(4-dichloromethylbenzoyl)benzyl]-4-toluenesulfonamide. | 1-(4-dichloromethylbenzoyl)-3,4,5,6-tetrahydro-5-tolyl-sulfonyl-2,5-benzodiazocine. |

EXAMPLE XXII

When the procedure of Examples XIII to XXI is employed utilizing as starting material an appropriate amide as prepared in Examples X to XIII, the following products are obtained:

| Sulfonamides | Tetrahydro-2,5-benzodiazocines |
| --- | --- |
| N-[2-aminoethyl]-N-[2-(N-[2-(4-fluorobenzoyl)benzyl]-4-toluenesulfonamide. | 3,4,5,6-tetrahydro-1-(4-fluorophenyl)-5-(4-tolylsulfonyl)-2,5-benzodiazocine. |
| N-[2-aminoethyl]-N-[2-(4-bromobenzoyl)-5-nitrobenzyl]-benzenesulfonamide. | 1-(4-bromophenyl)-3,4,5,6-tetrahydro-8-nitro-5-phenyl,sulfonyl-2,5-benzodiazocine. |
| N-(2-aminoethyl)-N-[2-(4-propoxybenzoyl)benzyl]phenyl-sulfonamide. | 3,4,5,6-tetrahydro-5-phenyl-sulfonyl-1-(4-propoxyphenyl)-2,5-benzodiazocine. |
| N-[2-aminoethyl]-N-[2-(3-ethoxybenzoyl)-4-trifluoromethylbenzyl]-benzenesulfonamide. | 9-trifluoromethyl-1-(3-ethoxyphenyl)-3,4,5,6-tetrahydro-5-phenylsulfonyl-2,5-benzodiazocine. |
| N-[2-aminoethyl]-N-[2-(4-fluorobenzoyl)benzyl]-benzenesulfonamide. | 1-(4-fluorophenyl)-3,4,5,6-tetrahydro-5-phenylsulfonyl-2,5-benzodiazocine. |
| N-[2-aminoethyl]-N-[2-benzoyl-4-fluorobenzyl]-benzenesulfonamide. | 9-fluoro-3,4,5,6-tetrahydro-1-phenyl-5-phenylsulfonyl-2,5-benzodiazocine. |
| N-[2-aminoethyl]-N-[2-benzoyl-5-butoxybenzyl]-benzenesulfonamide. | 8-butoxy-3,4,5,6-tetrahydro-1-phenyl-5-phenylsulfonyl-2,5-benzodiazocine. |
| N-[2-aminoethyl]-N-[2-benzoyl-4,5-dibromobenzyl]-propanesulfonamide. | 8,9-dibromo-3,4,5,6-tetrahydro-1-phenyl-5-propyl-sulfonal-2,5-benzodiazocine. |
| N-[2-aminoethyl]-N-[2-benzoyl-5-trifluoromethylbenzyl]-butanesulfonamide. | 5-butylsulfonyl-8-trifluoromethyl-3,4,5,6-tetrahydro-1-phenyl-2,5-benzodiazocine. |
| N-[2-aminoethyl]-N-[2-benzoyl-4-dichloromethylbenzyl]-propanesulfonamide. | 9-dichloromethyl-5-propyl-sulfonyl-3,4,5,6-tetrahydro-1-phenyl-2,5-benzodiazocine. |

EXAMPLE XXIII

A solution of 0.38 g. of 1-(4-chlorophenyl)-3,4,5,6-tetrahydro-5-phenylsulfonyl-2,5-benzodiazocine, as prepared in Example XIII, in 20 ml. of methanol containing 0.07 g. of platinum oxide is allowed to absorb the theoretical quantity of hydrogen under atmospheric pressure. After removing the catalyst by filtration, the methanol is evaporated to dryness affording 0.35 g. of product which upon recrystallization from ethanol and water yields 1-(4-chlorophenyl)-1,2,3,4,5,6-hexahydro - 5 - phenylsulfonyl-2,5-benzodiazocine, M.P. 147–149° C.

*Analysis.*—Calc'd for $C_{22}H_{21}ClN_2O_2S$ (percent): C, 63.99; H, 5.13; N, 6.77; S, 7.77; Cl, 8.59. Found (percent): C, 63.65; H, 5.02; N, 6.78; S, 8.0; Cl, 8.6.

A mixture of 0.35 g. of 1-(4-chlorophenyl)-1,2,3,4,5,6-hexahydro-5-phenylsulfonyl-2,5-benzodiazocine and 5 ml. of 90% sulfuric acid is warmed in a steam bath until a clear solution forms. Thereafter, the reaction mixture is allowed to stand at room temperature for thirty minutes, quenched with ice water and extracted with ether. The aqueous portion is neutralized with 50% sodium hydroxide solution, extracted with ether and the combined ether extracts are evaporated to dryness. The residual oil is 1-(4-chlorophenyl)-1,2,3,4,5,6-hexahydro-2,5-benzodiazocine which is dissolved in 10 ml. of absolute ethanol and saturated with anhydrous hydrogen chloride. The precipitated solid is separated by filtration and washed thoroughly with ethanol and acetone. After drying, there is obtained 0.4 g. of 1-(4-chlorophenyl)-1,2,3,4,5,6 - hexahydro - 2,5 - benzodiazocine dihydrochloride, M.P. 318° C. (dec.).

EXAMPLE XXIV

Hydrogenation of 0.43 g. of 1-(4-chlorophenyl)-3,4,5,6 - tetrahydro-5-(4-tolylsulfonyl)-2,5-benzodiazocine, as prepared in Example XIII, with the theoretical quantity of hydrogen at atmospheric pressure using 0.07 g. of platinum oxide affords 0.43 g. of 1-(4-chlorophenyl)-1,2,3,4,5,6-hexahydro - 5 - (4-tolylsulfonyl)-2,5-benzodiazocine, M.P. 135–137° C.

A mixture of 0.27 g. of the above prepared 1-(4-chlorophenyl) - 1,2,3,4,5,6 - hexahydro-5-(4-tolylsulfonyl)-2,5-benzodiazocine and 2.5 ml. of 90% sulfuric acid is warmed in a steam bath until a clear solution forms and is then allowed to stand at room temperature for thirty minutes. Thereafter, the soltuion is quenched with ice water and extracted with ether. The aqueous portion is neutralized with 50% sodium hydroxide solution, extracted with ether and the combined ether extracts are evaporated to dryness. The residual oil is dissolved in 5 ml. of absolute ethanol and saturated with anhydrous hydrogen chloride. The precipitated solid is separated by filtration and washed thoroughly with ethanol and acetone. After drying, there is obtained 0.2 g. of 1-(4-chlorophenyl)-1,2,3,4,5,6-hexahydro-2,5-benzodiazocine dihydrochloride, M.P. 318° C. (dec.).

EXAMPLE XXV

The procedure of Examples XXIII and XXIV is repeated to hydrogenate the 5-sulfonyl-tetrahydro-2,5-benzodiazocine products of Example XV to produce the hereinafter listed 5-sulfonyl-hexahydro-2,5-benzodiazocines which are then desulfonated to afford the following hexahydro-2,5-benzodiazocines:

| 5-sulfonyl-hexahydro-2,5-benzodiazocines | Hexahydro-2,5-benzodiazocines |
|---|---|
| 9-bromo-1,2,3,4,5,6-hexahydro-5-methylsulfonyl-1-phenyl-2,5-benzodiazocine. | 9-bromo-1,2,3,4,5,6-hexahydro-1-phenyl-2,5-benzodiazocine. |
| 1,2,3,4,5,6-hexahydro-7-fluoro-5-(4-methoxyphenyl sulfonyl)-1-phenyl-2,5-benzodiazocine. | 1,2,3,4,5,6-hexahydro-7-fluoro-1-phenyl-2,5-benzodiazocine. |

EXAMPLE XXVI

A mixture of 3,4,5,6-tetrahydro-1-phenyl-5-propylsulfonyl-2,5-benzodiazocine (0.5 g.), as prepared in Example XVI, in 50 ml. of methanol containing 0.1 g. of platinum oxide is contacted with hydrogen under reduced pressure until the hydrogenation is complete. After removing the catalyst by filtration, the solution is evaporated to dryness and the residue recrystallized from methanol to afford 1,2,3,4,5,6-hexahydro-1-phenyl - 5 - propylsulfonyl - 2,5-benzodiazocine.

A mixture of 0.25 g. of the aforesaid sulfonyl hexahydrobenzodiazocine and 2.0 ml. of 95% sulfuric acid is heated to 60° C. until solution is complete and then allowed to stand at room temperature for three hours. Thereafter, the reaction mixture is neutralized with a 30% potassium hydroxide solution, extracted with chloroform and the combined extracts are evaporated to dryness. The residue is 1,2,3,4,5,6-hexahydro-1-phenyl-2,5-benzodiazocine.

Similarly, hydrogenating 1-(3,4-dichlorophenyl)-3,4,5,6 - tetrahydro - 5 - (4 - chlorophenylsulfonyl)-2,5-benzodiazocine yields 1-(3,4-dichlorophenyl)-1,2,3,4,5,6-hexahydro-5-(4-chlorophenylsulfonyl) - 2,5 - benzodiazocine which is then desulfonated to afford 1-(3,4-dichlorophenyl)-1,2,3,4,5,6-hexahydro-2,5-benzodiazocine.

EXAMPLE XXVII

A mixture of 1-(4-bromophenyl)-5-(4-bromophenylsulfonyl)-3,4,5,6-tetrahydro-2,5-benzodiazocine (1.0 g.), as prepared in Example XVII, in 100 ml. of ethanol containing 2.0 g. of 10% palladium on charcoal is placed under a hydrogen atmosphere for four hours. Thereafter, the catalyst is removed by filtration, the solution is evaporated to dryness and the residue recrystallized from ethanol to obtain 1-(4-bromophenyl)-5-(4-bromophenylsulfonyl)1,2,3,4,5,6-hexahydro-2,5-benzodiazocine.

A mixture of 0.5 g. of the aforesaid sulfonyl hexahydrobenzodiazocine and 4.0 ml. of 95% sulfuric acid is heated to 80° C. until solution is complete and then allowed to stand at room temperature for two hours. Thereafter, the reaction mixture is neutralized with 2 N sodium hydroxide solution, extracted with ether and the combined extracts are evaporated to dryness. The residue is 1-(4-bromophenyl)-1,2,3,4,5,6-hexahydro - 2,5 - benzodiazocine.

Similarly, 1 - (2,4-dibromophenyl)-5-(4-bromophenylsulfonyl)-3,4,5,6-tetrahydro - 2,5 - benzodiazocine is hydrogenated and desulfonated to yield 1-(2,4-dibromophenyl)-1,2,3,4,5,6-hexahydro-2,5-benzodiazocine.

EXAMPLE XXVIII

Dimethylamino-borane (1.8 g.) in 20 ml. of glacial acetic acid is slowly added with stirring at 20° C. to 20 ml. of glacial acetic acid containing 5-(4-ethoxyphenylsulfonyl)-3,4,5,6-tetrahydro - 1 - trifluoromethylphenyl-2,5-benzodiazocine. When the addition is complete, the reaction mixture is refluxed for fifteen minutes, cooled and admixed with cold water until precipitation is complete. Thereafter, the precipitate is filtered, washed with water and dried to afford 5-(4-ethoxyphenylsulfonyl)-1,2,3,4,5,6-hexahydro-1 - (4 - trifluoromethylphenyl) - 2,5 - benzodiazocine.

A mixture of 5.0 g. of the above prepared sulfonyl-hexahydrobenzodiazocine and 35 ml. of 90% sulfuric acid is heated to 100° C. until solution is complete and then allowed to stand at room temperature for thirty minutes. Thereafter, the reaction mixture is neutralized with 3 N sodium hydroxide solution, extracted with benzene and the combined extracts are evaporated to dryness. The residue is dissolved in 10 ml. of absolute ethanol and saturated with hydrogen chloride to yield 1,2,3,4,5,6-hexahydro - 1 - (4 - trifluoromethylphenyl) - 2,5 - benzodiazocine dihydrochloride.

Similarly, starting with the appropriate 5-sulfonyl-tetrahydro-2,5-benzodiazocines the following 5-sulfonyl-hexahydro-2,5-benzodiazocines and hexahydro-2,5-benzodiazocines are obtained:

| 5-sulfonyl-hexahydro-2,5-benzodiazocines | Hexahydro-2,5-benzodiazocines |
|---|---|
| 1-(4-dichloromethylphenyl)-5-ethylsulfonyl-1,2,3,4,5,6-hexahydro-2,5-benzodiazocine. | 1-(4-dichloromethylphenyl)-1,2,3,4,5,6-hexahydro-2,5-benzodiazocine. |
| 1,2,3,4,5,6-hexahydro-5-phenylsulfonyl-1-thienyl-2,5-benzodiazocine. | 1,2,3,4,5,6-hexahydro-1-thienyl-1-2,5-benzodiazocine. |

EXAMPLE XXIX

To a stirring suspension of 3.0 g. of lithium aluminum hydride in 75 ml. of dry tetrahydrofuran, there is slowly added 5.0 g. of 5-phenylsulfonyl-3,4,5,6-tetrahydro-1-(4-methoxyphenyl)-2,5-benzodiazocine. The reaction mixture is heated under reflux for two hours. Thereafter, the reaction mixture is admixed with 75 ml. of a water-tetrahydrofuran mixture and 30 ml. of a 10% sodium hydroxide solution. The resulting mixture is filtered and the filtrate dried over magnesium sulfate. The filtrate is evaporated to dryness and the residue crystallized from ethanol to afford 5-phenylsulfonyl-1,2,3,4,5,6-hexahydro-1-(4-methoxyphenyl)-2,5-benzodiazocine.

A mixture of 2.5 g. of the above prepared sulfonyl-hexahydrobenzodiazocine and 20 ml. of 90% sulfuric acid is heated to 70° C. until solution is complete and then allowed to stand at room temperature for thirty minutes. Thereafter, the reaction mixture is neutralized with 2 N sodium hydroxide solution, extracted with ether and the combined extracts are evaporated to dryness. The residue is 1,2,3,4,5,6 - hexahydro - 1-(4-methoxyphenyl)-2,5-benzodiazocine.

EXAMPLE XXX

When the procedures of Examples XXIII to XXIX are repeated, employing some of the 5-sulfonyl-tetrahydro-2,5-benzodiazocines from Example XX as starting materials, the following 5 - sulfonyl - hexahydro - 2,5 - benzodiazocines and hexahydro-2,5-benzodiazocines are obtained:

| 5-sulfonyl-hexahydro-2,5-benzodiazocines | Hexahydro-2,5-benzodiazocines |
|---|---|
| 10-chloro-1,2,3,4,5,6-hexahydro-5-(4-fluorophenylsulfonyl)-1-phenyl-2,5-benzodiazocine. | 10-chloro-1,2,3,4,5,6-hexahydro-1-phenyl-2,5-benzodiazocine. |
| 1,2,3,4,5,6-hexahydro-9-methyl-1-phenyl-5-(4-propylphenylsulfonyl)-2,5-benzodiazocine. | 1,2,3,4,5,6-hexahydro-9-methyl-1-phenyl-2,5-benzodiazocine. |
| 8,9-dichloro-1,2,3,4,5,6-hexahydro-1-phenyl-5-(4-methoxyphenylsulfonyl)-2,5-benzodiazocine. | 8,9-dichloro-1,2,3,4,5,6-hexahydro-1-phenyl-2,5-benzodiazocine. |
| 1,2,3,4,5,6-hexahydro-8-methoxy-1-phenyl-5-phenyl sulfonyl-2,5-benzodiazocine. | 1,3,3,4,5,6-hexahydro-8-methoxy-1-phenyl-2,5-benzodiazocine. |

EXAMPLE XXXI

A solution of 40.0 g. of 3,4,5,6-tetrahydro-1-(4-nitrophenyl)-5-phenylsulfonyl-2,5-benzodiazocine in 200 ml. of methanol containing 0.7 g. of platinum oxide is allowed to absorb the theoretical quantity of hydrogen under reduced pressure. After removing the catalyst by filtration, the solution is evaporated to dryness and the residue recrystallized from ethanol and water to afford 1,2,3,4,5,6-hexahydro-1-(4-aminophenyl) - 5 - phenylsulfonyl-2,5-benzodiazocine.

A mixture of 20.0 g. of the aforesaid sulfonylhexahydrobenzodiazocine and 200 ml. of 80% sulfuric acid is heated to 100° C. until the solution is complete and then allowed to stand at room temperature for five hours. Thereafter, the reaction mixture is neutralized with 4 N sodium hydroxide solution, extracted with ether and the combined extracts are evaporated to dryness. The residue is 1,2,3,4,5,6 - hexahydro - 1-(4-aminophenyl)-2,5-benzodiazocine.

Similarly, employing the aforesaid procedure, the following 5 - sulfonyl-hexahydro - 2,5 - benzodiazocines and hexahydro-2,5-benzodiazocines are prepared:

| 5-sulfonyl-hexahydro-2,5-benzodiazocines | Hexahydro-2,5-benzodiazocines |
|---|---|
| 1-(4-ethoxyphenyl)-1,2,3,4,5,6-hexahydro-5-phenylsulfonyl-2,5-benzodiazocine. | 1-(4-ethoxyphenyl)-1,2,3,4,5,6-hexahydro-2,5-benzodiazocine. |
| 1-(4-dichloromethylbenzoyl)-1,2,3,4,5,6-hexahydro-5-phenylsulfonyl-2,5-benzodiazocine. | 1-(4-dichloromethylphenyl)-1,2,3,4,5,6-hexahydro-2-5-benzodiazocine. |

EXAMPLE XXXII

When the procedure of Example XXXI is repeated, utilizing as starting materials appropriate 5-sulfonyl-tetrahydro-2,5-benzodiazocines, as prepared in Example XXII, the following products are obtained:

| 5-sulfonyl-hexahydro-2,5-benzodiazocines | Hexahydro-2,5-benzodiazocines |
|---|---|
| 1,2,3,4,5,6-hexdro-1-(4-fluorophenyl)-5-(4-tolylsulfonyl))-2,5-benzodiazocine. | 1,2,3,4,5,6-hexahydro-1-(4-fluorophenyl)-2,5-benzodiazocine. |
| 1-(4-bromophenyl)-1,2,3,4,5,6- hexahydro-8-amino-5-phenylsulfonyl-2,5-benzodiazocine. | 1-(4-bromophenyl)-1,2,3,4,5,6-hexahydro-8-amino-2,5-benzodiazocine. |
| 1,2,3,4,5,6-hexahydro-5-phenylsulfonyl-1-(4-propoxyphenyl)-2,5-benzodiazocine. | 1,2,3,4,5,6-hexahydro-1-(4-propoxyphenyl)-2,5-benzodiazocine. |
| 9-triflouromethyl-1-(3-ethoxyphenyl)-1,2,3,4,5,6-hexahydro-5-phenylsulfonyl-2,5-benzodiazocine. | 9-trifluoromethyl-1-(3-ethoxyphenyl)-1,2,3,4,5,6-hexahydro-2,5-benzodiazocine. |
| 10-chloro-1,2,3,4,5,6-hexahydro-5-methylsulfonyl-1-phenyl-2,5-benzodiazocine. | 10-chloro-1,2,3,4,5,6-hexahydro-1-phenyl-2,5-benzodiazocine. |
| 1-(4-fluorphenyl)-1,2,3,4,5,6-hexahydro-5-phenylsulfonyl-2,5-benzodiazocine. | 1-(4-fluorophenyl)-1,2,3,4,5,6-hexahydro-2,5-benzodiazocine. |
| 9-fluoro-1,2,3,4,5,6-hexahydro-1-phenyl-5-phenylsulfonyl-2,5-benzodiazocine. | 9-fluoro-1,2,3,4,5,6-hexahydro-1-phenyl-2,5-benzodiazocine. |
| 8-butoxy-1,2,3,4,5,6-hexahydro-1-phenyl-5-phenylsulfonyl-2,5-benzodiazocine. | 8-butoxy-1,2,3,4,5,6-hexahydro-1-phenyl-2,5-benzodiazocine. |
| 8,9-dibromo-1,2,3,4,5,6-hexahydro-1-phenyl-5-propylsulfonyl-2,5-benzodiazocine. | 8,9-dibromo-1,2,3,4,5,6-hexahydro-1-phenyl-2,5-benzodiazocine. |
| 5-butysulfonyl-8-trifluoromethyl-1,2,3,4,5,6-hexahydro-1-phenyl-2,5-benzodiazocine. | 8-trifluoromethyl-1,2,3,4,5,6-hexahydro-1-phenyl-2,5-benzodiazocine. |
| 9-dichloromethyl-5-propylsufonyl-1,2,3,4,5,6-hexahydro-1-phenyl-2,5-benzodiazocine. | 9-dichloromethyl-1,2,3,4,5,6-hexahydro-1-phenyl-2,5-benzodiazocine. |

What is claimed is:

1. A compound selected from the group consisting of those having the formula:

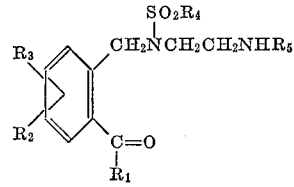

wherein $R_1$ is selected from the group consisting of phenyl, lower alkoxyphenyl, nitrophenyl, aminophenyl, halophenyl, halo(lower)alkylphenyl, thienyl and furyl; $R_2$ and $R_3$ are both selected from the group consisting of hydrogen, halogen, lower alkoxy, nitro, amino, and halo(lower)alkyl; $R_4$ is selected from the group consisting of lower alkyl, phenyl, lower alkylphenyl, lower alkoxyphenyl and halophenyl; $R_5$ is selected from the group consisting of hydrogen and lower alkanoyl and the acid addition salts thereof.

2. A compound as described in claim 1 which is: N-[2-(N-[2-(4 - chlorobenzoyl)benzyl] - phenylsulfonamido)ethyl]acetamide.

3. A compound as described in claim 1 which is: N-[2-(N-[2 - (4 - chlorobenzoyl)benzyl] - 4 - tolylsulfonamido)ethyl]acetamide.

4. A compound as described in claim 1 which is: N-[2-(N-[2-benzoylbenzyl - propylsulfonamido)ethyl]acetamide.

5. A compound as described in claim 1 which is: N-[2-(N-[2-(4-bromobenzoyl)benzyl]-4 - bromophenylsulfonamido)ethyl]acetamide.

6. A compound as described in claim 1 which is: N-[2-aminoethyl]-N - [2 - (4 - chlorobenzoyl)benzyl] - benzenesulfonamide.

7. A compound as described in claim 1 which is: N-[2-aminoethyl]-N-[2-(4-chlorobenzoyl)benzyl] - 4 - toluenesulfonamide.

8. A compound as described in claim 1 which is: N-[2-aminoethyl]-N-[2-benzoylbenzyl]propanesulfonamide.

9. A compound as described in claim 1 which is: N-[2-aminoethyl]-N-[2-(4-bromobenzoyl)benzyl] - 4 - bromobenzenesulfonamide.

References Cited

UNITED STATES PATENTS 3,496,164  2/1970  Kim et al. _____ 260—239

JOHN D. RANDOLPH, Primary Examiner

C. M. SHURKO, Assistant Examiner

U.S. Cl. X.R.

260—332.2